United States Patent [19]
Lock, III et al.

[11] Patent Number: 5,519,257
[45] Date of Patent: May 21, 1996

[54] AUTOMATIC WIPER-CONTROLLED VEHICLE HEADLAMPS

[75] Inventors: Robert L. Lock, III, Hunstville; Joseph T. Betterton, Arab, both of Ala.

[73] Assignee: Chrysler Corporation, Auburn Hills, Mich.

[21] Appl. No.: 320,366

[22] Filed: Oct. 11, 1994

[51] Int. Cl.$^6$ .................................................. B60Q 1/02
[52] U.S. Cl. .................................... 307/10.8; 315/83
[58] Field of Search .................... 307/10.1, 10.8; 315/77, 82, 83; 318/DIG. 2; 340/457.2; 362/802, 253, 61

[56] References Cited

U.S. PATENT DOCUMENTS

| | | | |
|---|---|---|---|
| 4,330,716 | 5/1982 | Rust | 307/10.8 |
| 4,656,363 | 4/1987 | Carter et al. | 315/82 |
| 4,985,660 | 1/1991 | Cronk | 315/82 |
| 5,027,001 | 6/1991 | Torbert | 307/10.1 |
| 5,051,873 | 9/1991 | Ruter | 315/82 |
| 5,120,981 | 6/1992 | Cope | 307/10.8 |
| 5,130,905 | 7/1992 | Ruter | 307/10.8 |
| 5,136,209 | 8/1992 | Benedict et al. | 307/10.8 |
| 5,138,183 | 8/1992 | Patterson | 307/10.8 |
| 5,170,097 | 12/1992 | Montemurro | 315/83 |
| 5,185,558 | 2/1993 | Benedit et al. | 315/82 |
| 5,187,383 | 2/1993 | Taccetta et al. | 307/10.8 |
| 5,202,581 | 4/1993 | Morre | 307/10.8 |
| 5,205,634 | 4/1993 | Ruter | 315/82 |
| 5,235,250 | 8/1993 | Cronk | 315/82 |
| 5,250,850 | 10/1993 | Pace et al. | 307/10.8 |
| 5,331,214 | 7/1994 | Mori et al. | 307/10.8 |

Primary Examiner—William M. Shoop, Jr.
Assistant Examiner—Richard T. Elms
Attorney, Agent, or Firm—Christopher A. Taravella

[57] ABSTRACT

A method for automatically controlling headlamps in response to windshield wiper controls is provided. A microcontroller senses the voltage levels of signals from a windshield wiper switch and a headlamp switch. If the microcontroller senses that the vehicle operator has turned on the windshield wiper switch, the microcontroller turns on the headlamps of a vehicle unless the windshield wipers are in intermittent mode or the operator of the vehicle has turned off the headlamps within a predetermined period of time.

14 Claims, 2 Drawing Sheets

AUTOMATIC WIPER-CONTROLLED VEHICLE HEADLAMPS

GROUND OF THE INVENTION

The present invention relates to a method for controlling vehicle headlamps. In particular, the invention provides for the automatic turn on of the headlamps of a vehicle in response to turning on the windshield wipers under certain conditions.

An increased number of states have enacted legislation directed to reducing the dangers of driving a vehicle in inclement weather. Visibility in rain, snow, and sleet can be significantly impaired, thus many states, such as the State of Alabama, have enacted legislation requiring that headlights be turned on when operating windshield wipers in such conditions. However, in many vehicles, the driver must make a conscious effort to turn on headlamps.

This problem has been addressed in the past with systems that automatically turn on the headlamps when the windshield wipers are turned on. U.S. Pat. No. 5,250,850 to Pace et al. discloses such a system and includes a latch to provide for continuous operation of the headlamps in the event that the windshield wipers are in a "pulsed" or intermittent mode. U.S. Pat. No. 4,656,363 to Carter et al. provides another such system but includes a 30 second turn off delay. That is, the headlamps turn off 30 seconds after power to the windshield wipers is discontinued. Because of this 30 second delay, the headlamps will operate continuously when the windshield wipers are in an intermittent mode. U.S. Pat. No. 5,120,981 to Cope discloses a system that turns on the headlamps when the windshield wipers are in a low speed mode, and turns on both the headlights and fog lights when the windshield wipers are in a high speed mode.

The above-described prior art systems all suffer from the same deficiencies. In particular, they do not recognize that when the windshield wipers are in the slow speed or in an "intermittent" mode, turning the headlamps on is probably not necessary. Many state laws, such as in the State of Alabama, do not require that the headlamps be turned on when windshield wipers are in the "intermittent" mode. This is in recognition of the fact that when the windshield wipers are in the "intermittent" mode, the driver is probably not addressing a weather condition where visibility is a problem.

Also, the prior art systems do not provide for an operator override. There may be reasons why the windshield wipers are on, even in the high speed mode, when the operator wishes to have the headlamps off, e.g., when washing the car.

It is therefore an object of the present invention to provide a system to automatically turn on the headlamps when the wipers are in use, but not when the windshield wipers are in the intermittent setting.

It is another object of the invention to provide the operator of the vehicle with a means to turn off the headlamps even when the windshield wipers are in the high speed mode.

SUMMARY OF THE INVENTION

The present invention provides a method for automatically controlling headlamps in response to windshield wiper controls.

In an illustrative embodiment of the invention, a microcontroller senses the voltage levels of signals from a windshield wiper switch, and a headlamp switch. A timer determines the period of time since the operator last turned off the headlamp switch. If the microcontroller senses that the vehicle operator has turned on the windshield wiper switch, the microcontroller turns on the headlamps of the vehicle, unless the headlamps are already on, the windshield wipers are in an intermittent mode, or the operator of the vehicle has turned off the headlamps within a predetermined period of time.

BRIEF DESCRIPTION OF THE DRAWINGS

The foregoing and other features of the present invention will be more readily apparent from the following detailed description of preferred embodiments taken in conjunction with the attached drawings wherein.

DETAILED DESCRIPTION OF PREFERRED EMBODIMENTS

Figure 1:
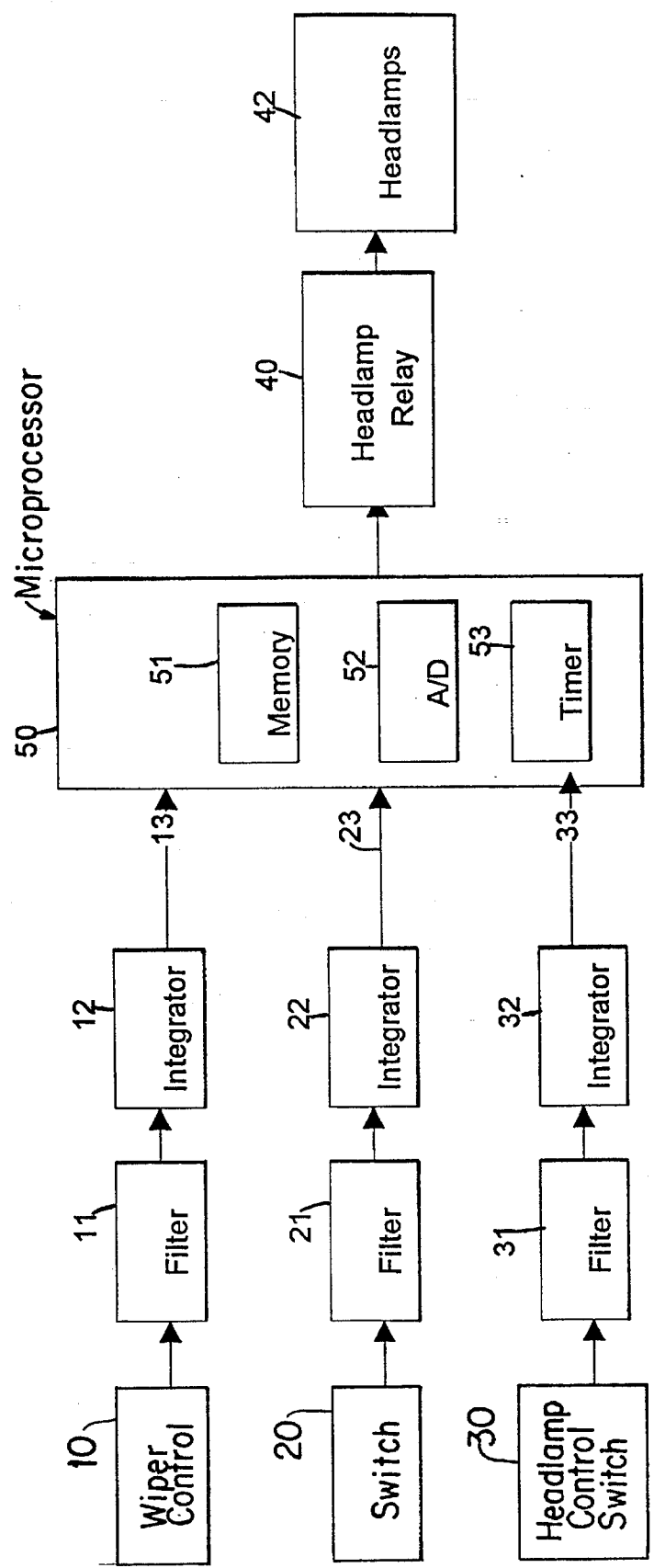
FIG. 1 is a block diagram of the system of the present invention.

FIG. 1 illustrates a block diagram of the present invention. Referring to the figure, a microprocessor 50, preferably including a memory means 51, an analog-to-digital converter (A/D) means 52, and a timer 53, samples the voltage level of ignition switch 30 through a filter 31 and integrator 32. The voltage level is converted to a digital signal via analog-to-digital (A/D) converter 52. This digital signal is then used by the microprocessor 50 as a reference level when other input analog signals are to be converted to digital signals.

The microprocessor 50 also detects the voltage level of the signal from a windshield wiper control switch 10. Windshield wiper control switch 10 is a user controlled variable switch that provides a user with speed control over a vehicle's windshield wipers. These speeds can be a high speed, low speed, and variable intermittent. The windshield wiper control switch 10 applies a constant current source to a known circuit arrangement of resistors and a rheostat to control the voltage level of the output signal. The voltage of the output signal is preferably proportional to the speed at which vehicle's windshield wipers are to operate. That is, to operate the windshield wipers at their high constant speed, the windshield wiper control switch 10 is preferably set to provide a very high impedance thus creating a signal at a maximum voltage level. To operate the windshield wipers at a slow speed, the windshield wiper switch 10 is adjusted to provide lower impedance, thus reducing the voltage level of the output signal. In the intermittent operation mode, the impedance is adjusted to be within a predetermined range of impedances. At the lowest impedance level within the range, the windshield wipers will be in their slowest intermittent operation mode, etc. Finally, to turn the windshield wipers off, the windshield wiper switch 10 is completely opened.

The signal from windshield wiper control switch 10 is applied to a filter 11 and an integrator 12. The integrated signal is converted to a digital signal by microprocessor 50 via the analog-to-digital (A/D) converter 52 using the voltage level of the ignition switch 30 as a reference level. From the digital signal, the microprocessor 50 can easily determine the speed at which to set the windshield wipers.

Finally, microprocessor 50 detects the voltage level of a signal from headlamp control switch 20. The headlamp control switch 20 is preferably capable of generating three different voltage levels depending on whether the headlamps are to be turned off, low-beams are to be turned on, or high-beams are to be turned on. The signal from headlamp switch 20 is applied to a filter 21 and an integrator 22. The microprocessor 50 then converts the integrated signal to a digital signal via A/D converter 52 using the signal level from the ignition switch 30 as a reference.

Figure 2:
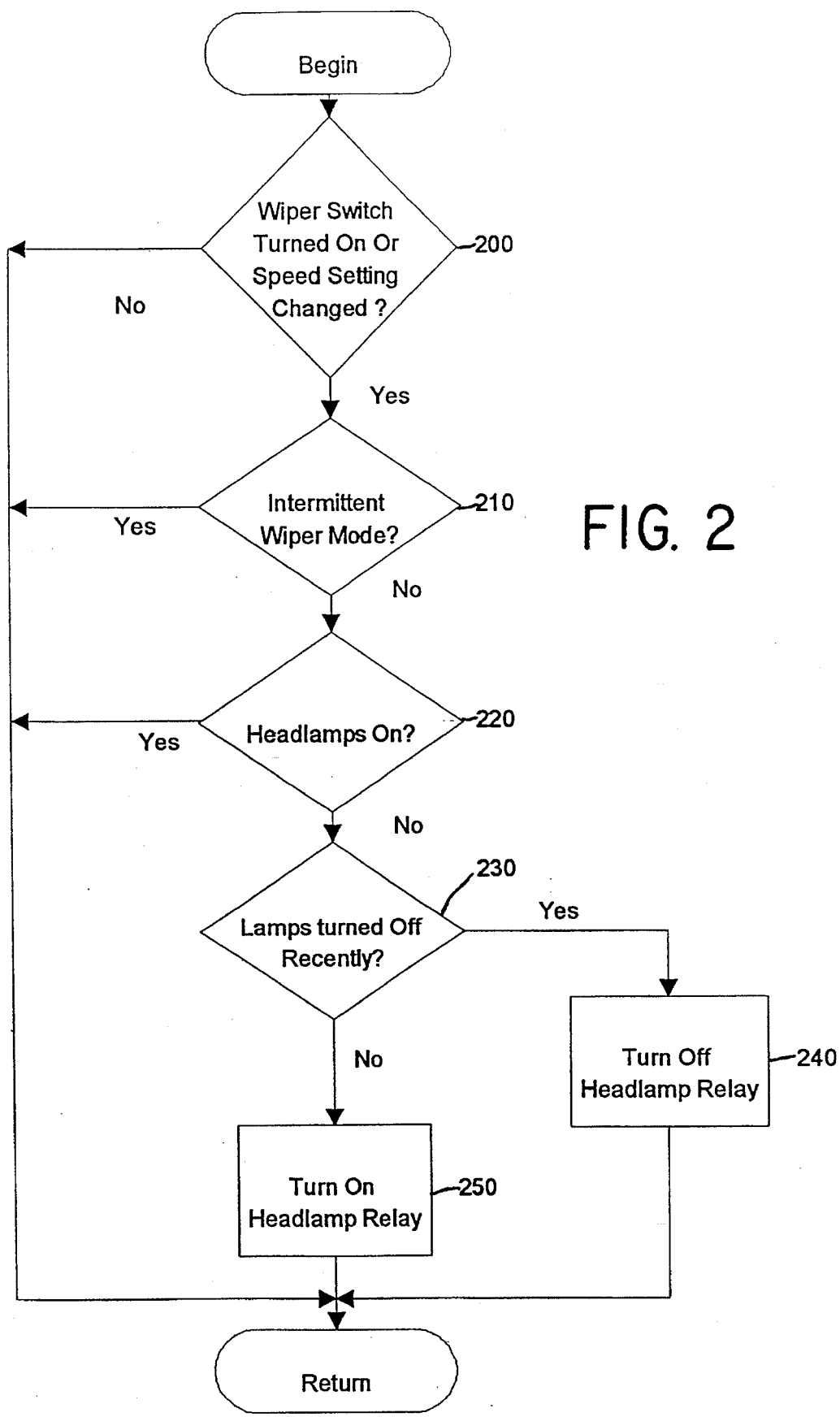
FIG. 2 illustrates a flowchart of the operation of the present invention.

Based on the input from the windshield wiper control switch 10 and the headlamp control switch 20, the microprocessor 50 determines what action is necessary. Referring now additionally to the flowchart in FIG. 2, the microprocessor 50 detects the voltage level at the windshield wiper switch 10 to determine whether the wipers have been turned on or whether the speed setting has been adjusted (step 200). The microprocessor preferably compares the current voltage level at the windshield wiper switch 10 with a previously sampled and stored windshield wiper switch voltage level (in memory 51) to make the determination. A digital signal from the windshield wiper switch 10 having a level of zero preferably indicates that the windshield wiper switch 10 is off. Thus, if the newly sampled voltage level is not zero and is not the same as the previously stored value, the windshield wipers have either been turned on or the speed setting has changed. If the windshield wiper switch 10 was turned on or the speed was adjusted, the microprocessor 50 determines whether the windshield wipers are in an "intermittent mode" (step 210). A voltage level below a predetermined threshold level, but greater than zero, preferably indicates to the microprocessor 50 that the windshield wipers are set for the "intermittent mode." If the voltage level is below the threshold level, microprocessor 50 will not turn on the headlamp relay 40. The presumption is, of course, that when the windshield wipers are set to the intermittent range, the operator is probably not addressing a weather condition requiring the use of headlamps.

Finally, the microprocessor 50 determines whether the headlamps 42 are off (step 220). It does so by considering the digital signal from the headlamp control switch 20. If the digital signal from the headlamps control switch 20 has a voltage level of zero, the headlamps are off. If the headlamps 42 are off, the microprocessor 50 calculates how long they have been off by comparing the time at which the user turned off the headlamps to the current time (step 230). It is understood that this, of course, implies that microprocessor 50 keeps track of the time when the headlamps are turned off, preferably by storing the time in memory means 51.

Alternatively, timer 53 can be reset whenever the headlamps are turned off and the count in timer 53 represents the elapsed time. If the elapsed time is greater than some predetermined amount of time, the microprocessor 50 turns on the headlamp relay 40 (step 250). An elapsed time less than the predetermined amount of time indicates that the user wishes to override the automatic headlamp turn-on feature, thus the microprocessor turns off the headlamp relay 40 (step 240).

In another embodiment, microprocessor 50 detects whether the headlamps are on, not through the headlamp control switch 20, but instead by sampling the voltage at the headlamp relay 40.

While the present invention has been particularly shown and described with reference to preferred embodiments thereof, it will be understood by those skilled in the art that various changes in form and details may be made therein without departing from the spirit and scope of the invention.

What is claimed is:

1. A method for controlling the operation of headlamps in conjunction with the operation of windshield wipers comprising the steps of:

detecting whether the windshield wipers are in an on condition;

detecting whether the headlamps are in an on condition;

determining if the headlamps were turned off within a predetermined period of time; and turning on the headlamps if the windshield wipers are on and the headlamps have not been turned off within the predetermined period of time.

2. The method of claim 1 wherein the windshield wipers have an intermittent operation mode and further comprising the steps of:

detecting whether the windshield wipers are in the intermittent operation mode; and inhibiting the turning on of the headlamps if the windshield wipers are in the intermittent operation mode.

3. The method of claim 2 wherein the windshield wipers are controlled by a windshield wiper switch that produces a voltage to indicate its state and the headlamps are controlled by a headlamp switch that produces a voltage to indicate its state, and wherein the steps of detecting involve sampling the windshield wiper switch voltage and headlamp switch voltage.

4. The method of claim 1 wherein the steps of determining and turning on are performed by a microprocessor.

5. A method for controlling the operation of headlamps in conjunction with the operation of windshield wipers comprising the steps of:

detecting a voltage level of a signal from a windshield wiper switch means, wherein a detected voltage of substantially zero indicates that said windshield wiper switch means is off, and a detected voltage not substantially zero indicates that said windshield wiper switch means is on;

detecting a voltage level of a second signal from a headlamp switch means, wherein a detected voltage of substantially zero indicates that the headlamp switch means is off, and a detected voltage not substantially zero indicates that said headlamp switch means if on;

determining the amount of time that the headlamp switch means has been off if the detected headlamp switch means is off; and turning on the headlamps if the windshield wiper switch means is on, the headlamp switch means is off, and the amount of time that the headlamp switch means has been off is greater than a predetermined amount of time.

6. The method of claim 5 wherein a detected voltage of the signal from the windshield wiper switch means of greater than zero volts and less than a threshold voltage indicates that the windshield wiper switch means is in an intermittent operation mode, and further comprising the step of:

inhibiting turning on the headlamps if windshield wiper switch means is in the intermittent operation mode.

7. A method for controlling the operation of headlamps in conjunction with the operation of windshield wipers comprising the steps of:

detecting whether a windshield wiper switch means is in one of an on and off condition;

detecting whether the windshield wiper switch means is in an intermittent operation mode condition;

detecting whether a headlamp switch means is in one of an on and off condition; and turning on the headlamps if the windshield wiper switch means is in an on condition, the windshield wiper switch means is not in the intermittent operation mode condition, and the headlamp switch means is in the off condition.

8. The method of claim 7 further comprising the steps of:

determining the amount of time that the headlamp switch means has been in the off condition if the detected headlamp switch means is in the off condition;

inhibiting turning on the headlamps if the headlamp switch means has been in an off condition for less than a predetermined amount of time.

9. A method for controlling operation of headlamps in conjunction with operation of windshield wipers comprising the steps of:

detecting a voltage level of a signal output from a windshield wiper switch means, wherein a detected voltage of substantially zero indicates that said windshield wiper switch means is off, a detected voltage not substantially zero indicates that said wiper switch means is on, and a detected voltage of the signal of greater than zero volts and less than a threshold voltage indicates that the windshield wiper switch means is in an intermittent operation mode;

detecting a voltage level of a second signal output from a headlamp switch means, wherein a detected voltage of substantially zero indicates that the headlamp switch means is off, and a detected voltage not substantially zero indicates that said headlamp switch means is on; and turning on the headlamps if the windshield wiper switch means is on and not in the intermittent operation mode, and the headlamp switch means is off.

10. The method of claim 9 further comprising the steps of:

determining the amount of time that the headlamp switch means has been in an off condition if the detected headlamp switch means is off;

inhibiting the turning on of the headlamps if the amount of time that the headlamp switch means has been off is less than a predetermined amount of time.

11. A method for controlling the operation of headlamps in conjunction with the operation of windshield wipers comprising the steps of:

detecting whether a windshield wiper switch means is in an on condition;

detecting whether the headlamps are in an on condition;

determining if an operator has turned the headlamps off within a predetermined period of time, if the headlamps are in an off condition; and turning on the headlamps if the windshield wiper switch means in the on condition and the headlamps have not been turned off within the predetermined period of time.

12. The method of claim 11 further comprising the steps of:

detecting whether a windshield wiper switch means is in an intermittent operation mode condition;

turning on the headlamps only if the windshield wiper switch means is not in an "intermittent mode."

13. A method for controlling the operation of headlamps in conjunction with the operation of windshield wipers comprising the steps of:

detecting whether a windshield wiper switch means is in an on condition;

detecting whether the windshield wiper switch means is in an intermittent operation mode condition;

detecting whether the headlamps are in one of an on and off condition; and turning on the headlamps if the windshield wiper switch means is in an on condition, the windshield wiper switch means is not in the intermittent operation mode condition, and the headlamps are in an off condition.

14. The method of claim 13 further comprising the steps of:

determining the amount of time that the headlamps have been in the off condition if the detected headlamps are in the off condition;

inhibiting the turning on of the headlamps if the headlamps have been in the off condition for less than a predetermined amount of time.

* * * * *